United States Patent
Schulte-Rebbelmund et al.

(10) Patent No.: US 12,242,276 B2
(45) Date of Patent: Mar. 4, 2025

(54) AUTONOMOUS VEHICLE WITH A SENSOR DEVICE

(71) Applicant: KUKA Deutschland GmbH, Augsburg (DE)

(72) Inventors: Till Schulte-Rebbelmund, Augsburg (DE); Markus Wuensch, Augsburg (DE)

(73) Assignee: KUKA Deutschland GmbH (DE)

( * ) Notice: Subject to any disclaimer, the term of this patent is extended or adjusted under 35 U.S.C. 154(b) by 862 days.

(21) Appl. No.: 17/433,419

(22) PCT Filed: Feb. 4, 2020

(86) PCT No.: PCT/EP2020/052715
§ 371 (c)(1),
(2) Date: Aug. 24, 2021

(87) PCT Pub. No.: WO2020/173673
PCT Pub. Date: Sep. 3, 2020

(65) Prior Publication Data
US 2022/0137635 A1    May 5, 2022

(30) Foreign Application Priority Data
Feb. 25, 2019 (DE) .................... 10 2019 202 511.0

(51) Int. Cl.
*G05D 1/02* (2020.01)
*G01S 17/86* (2020.01)
(Continued)

(52) U.S. Cl.
CPC ............ *G05D 1/0238* (2013.01); *G01S 17/86* (2020.01); *G01S 17/931* (2020.01)

(58) Field of Classification Search
None
See application file for complete search history.

(56) References Cited

U.S. PATENT DOCUMENTS

| | | | |
|---|---|---|---|
| 2004/0093650 A1 | 5/2004 | Martins et al. | |
| 2016/0063710 A1 | 3/2016 | Tanaka | |

FOREIGN PATENT DOCUMENTS

| | | | |
|---|---|---|---|
| CN | 101833092 A | 9/2010 | |
| CN | 112005553 A | * 11/2020 | ............ B60K 35/00 |

(Continued)

OTHER PUBLICATIONS

European Patent Office; Search Report in related International Patent Application No. PCT/EP2020/052715 dated May 26, 2020; 5 pages.

(Continued)

*Primary Examiner* — Hovhannes Baghdasaryan
(74) *Attorney, Agent, or Firm* — Dorton & Willis, LLP (57) ABSTRACT

An autonomous vehicle includes a vehicle body having a receiving device configured to receive an object to be transported, a chassis having at least one driven wheel, and at least one sensor device having a detection region surrounding the autonomous vehicle for recognizing obstacles which enter the detection region in the immediate surroundings of the autonomous vehicle. The autonomous vehicle includes a joint arrangement configured to adjust the sensor device relative to the vehicle body such that the sensor device can be operated in a first arrangement which monitors the basic peripheral contour of the vehicle body, and in at least one second arrangement which monitors a total peripheral contour including the basic peripheral contour and an expansion contour of the autonomous vehicle that is formed when an object to be transported is received.

14 Claims, 4 Drawing Sheets

(51) Int. Cl.
   *G01S 17/931*   (2020.01)
   *G05D 1/00*    (2006.01)

(56) References Cited

FOREIGN PATENT DOCUMENTS

| | | |
|---|---|---|
| DE | 101 96 988 T5 | 4/2004 |
| DE | 10 2009 015 648 A1 | 12/2010 |
| DE | 10 2011 085 019 B4 | 4/2013 |
| DE | 20 2013 004 209 U1 | 7/2013 |
| DE | 10 2013 020 177 A1 | 6/2014 |
| DE | 11 2014 004 163 T5 | 5/2016 |
| JP | H08166822 A | 6/1996 |
| JP | H09150690 A | 6/1997 |
| JP | H09300252 A | 11/1997 |
| JP | 2000263489 A | 9/2000 |
| WO | 0245914 A1 | 6/2002 |
| WO | 2012052554 A3 | 6/2012 |

OTHER PUBLICATIONS

German Patent Office; Examination Report in related German Patent Application No. 10 2019 202 511.0 dated Oct. 23, 2019; 6 pages.
Chinese Patent Office; Office Action in related Chinese Patent Application No. 202080016580.7 dated Jul. 12, 2023; 8 pages.

* cited by examiner

AUTONOMOUS VEHICLE WITH A SENSOR DEVICE

CROSS-REFERENCE TO RELATED APPLICATIONS

This application is a national phase application under 35 U.S.C. § 371 of International Patent Application No. PCT/EP2020/052715, filed Feb. 4, 2019 (pending), which claims the benefit of priority to German Patent Application No. DE 10 2019 202 511.0, filed Feb. 25, 2019, the disclosures of which are incorporated by reference herein in their entirety.

TECHNICAL FIELD

The invention relates to an autonomous vehicle, comprising a vehicle body having a receiving device which is designed to receive, on the vehicle body, a transport frame, a chassis having at least one driven wheel, and at least one sensor device, which has a detection region surrounding the autonomous vehicle for recognizing obstacles which enter the detection region of the sensor device in the immediate surroundings of the autonomous vehicle.

BACKGROUND

WO 02/45914 discloses a robot system comprising an autonomously moving robot which has wheels, a control computer, and sensors, which are used for navigation and communication.

The object of the invention is to create an autonomous vehicle that can reliably detect obstacles by means of a sensor device, even if the autonomous vehicle has received an object to be transported, in particular a transport frame, which at least partially protrudes into the detection region of the sensor device. In particular, this should also be possible for vehicles that move omnidirectionally.

SUMMARY

The object is inventively achieved by an autonomous vehicle, comprising a vehicle body having a receiving device which is designed to receive, on the vehicle body, an object to be transported, in particular a transport frame, a chassis having at least one driven wheel, and at least one sensor device, which has a detection region surrounding the vehicle body for recognizing obstacles which enter the detection region of the sensor device in the immediate surroundings of the autonomous vehicle, wherein the vehicle comprises a joint arrangement which is designed to adjust the sensor device in relation to the vehicle body in such a way that the sensor device can selectively
  be operated in a first arrangement which monitors the basic peripheral contour of the vehicle body, and
  be operated in at least one second arrangement which monitors a total peripheral contour consisting of the basic peripheral contour and an expansion contour of the autonomous vehicle that is formed when an object to be transported, in particular a transport frame, is received,
in which second arrangement the sensor device is repositioned in relation to the first arrangement in such a way that an object to be transported, in particular a transport frame, received by the autonomous vehicle is encompassed by an outwardly detecting detection region of the sensor device surrounding the total peripheral contour completely in the second arrangement.

By means of the invention, autonomous vehicles, in particular those with omnidirectional possibilities of movement, can be protected from collisions with obstacles, even if they received bulky and/or large transport frames and/or object to be transported. The autonomous vehicle can independently cover a preprogrammed path or a path generated by its own navigation and/or calculation. This can be provided in particular for use in factory buildings and/or supermarkets. The autonomous vehicle has a vehicle body having a receiving device which is designed to receive a transport frame and/or an object to be transported. The vehicle body has a basic contour which can correspond to the base area of the autonomous vehicle.

In the following, the invention is explained in more detail using a transport frame which represents a special type of an inventive object to be transported. What is specifically mentioned about the transport frame can also apply to such a different object to be transported, depending on the type and configuration of another object to be transported. The transport frame can, for example, have a container for piece goods and can be placed on the autonomous vehicle. The transport frame can change the size of the basic contour of the vehicle body, i.e. expand it, so that a total contour is created which can be larger than the basic contour of the autonomous vehicle. This can be the case, for example, when the transport frame has legs that allow the autonomous vehicle to drive under the transport frame for receiving. Transport frames having legs can restrict the use of autonomous vehicles with fixed sensor devices, for example by the fact that fixed sensors of the autonomous vehicle, which are intended to monitor the route of the autonomous vehicle for obstacles, incorrectly recognize the legs of the transport frame that has been received as an obstacle. Inventively, this malfunction of the sensors is to be prevented in a simple manner. Passive protection devices, which primarily serve to absorb collision energy, can be limited in their use by the transport frame and/or object to be transported, for example in that a collision would first take place with the transport frame and/or object to be transported and thus energy absorption by the passive protection device would be prevented. This can also be circumvented inventively.

The transport frame can, for example, have a surface on which objects, such as, for example, containers, can be set up and transported by the autonomous vehicle.

The autonomous vehicle has a chassis which has at least one driven wheel which is designed to drive and control the autonomous vehicle. The autonomous vehicle can accordingly also have two or more wheels, each of which can be driven and/or steered. In particular, the autonomous vehicle can have four wheels, which can each be driven and/or steered and/or allow for omnidirectional movement due to their special nature, in particular due to the structure known as the Mecanum wheel.

The autonomous vehicle has at least one sensor device which is designed to recognize obstacles in the immediate surroundings of the vehicle. Obstacles can be moving or stationary apparatuses and/or persons in factory halls and/or supermarkets who are in the route of the autonomous vehicle and/or cross the path of the autonomous vehicle. The at least one sensor device detects the obstacles in the surroundings of the vehicle, in particular by means of contact sensors or contactless sensors which are arranged on at least one side of the vehicle. The sensor devices can be arranged on all sides of the vehicle. In addition or as a replacement, at least one passive protective element for absorbing collision energy can be attached to the outer contour of the vehicle. The passive protective elements can be arranged on all sides of the vehicle.

In all inventive embodiment variants, the sensor devices are already formed by a simple, passive protection device. The passive protection device can be formed, for example, by resilient bumper means, similarly by bumper bars, which are temporarily deformed in the event of a collision with an object in order to reduce the impact energy of the collision and which preferably return to their original shape after separation from the collision object. In this respect, such passive protection devices, i.e. resilient bumper means, are designed to form a detection region surrounding the autonomous vehicle for recognizing obstacles which enter the detection region of the passive protection device, i.e. of the resilient bumper means, in the immediate surroundings of the autonomous vehicle.

The autonomous vehicle has an inventive joint arrangement, which is designed to adjust the sensor device and/or passive protection device. The joint arrangement can assume at least two positions. In this respect, the joint arrangement makes it possible that the optional sensor device and/or passive protection device can be selectively aligned in such a way that either only the basic peripheral contour of the autonomous vehicle is protected from collisions, or the total peripheral contour is also protected from collisions that result when the autonomous vehicle has received the transport frame and/or object to be transported by means of the receiving device thereof.

The sensor device and/or passive protection device can accordingly be arranged on at least one joint part or joint arm, such that the sensor device and/or passive protection device can be realigned by virtue of the joint part or joint arm or the joint parts or joint arms. A different alignment makes it possible, for example, for the sensor device and/or passive protection device to be positioned past the legs of a transport frame attached to the vehicle, whereby the sensor device and/or protection device then also protects the transport frame as part of the autonomous vehicle from obstacles and does not mistakenly perceive the transport frame as a foreign obstacle nor does it come into contact with an obstacle first.

In the first arrangement, the joint arrangement is aligned in such a way that the basic peripheral contour of the autonomous vehicle alone, i.e. without a received transport frame, is protected from collisions.

In at least one second arrangement, the joint arrangement is positioned in such a way that the total peripheral contour, consisting of the autonomous vehicle and a received transport frame, is protected from collisions. In the second arrangement, the joint arrangement can in particular be positioned in such a way that the sensor device and/or passive protection device protects the total peripheral contour, for example also the legs of a transport frame, from collisions. The sensor device and/or passive protection device can be moved around the transport frame with the aid of the joint arrangement in this respect and positioned outside the total peripheral contour.

The joint arrangement can have at least two links and at least one joint, a first link being connected to the vehicle and a second link having the sensor device and/or passive protection device, and the joint adjustably connecting the first link to the second link. The first link connected to the autonomous vehicle can be part of the vehicle body, be connected thereto, and/or be designed in one piece therewith.

By virtue of the joint arrangement, the sensor device and/or passive protection device can be repositioned in such a way that selectively either the basic peripheral contour of the autonomous vehicle alone or the total peripheral contour of the autonomous vehicle and the transport frame received can be protected from collisions with obstacles without the transport frame being incorrectly recognized as an obstacle. The joint arrangement has, for example, two links and a joint, which allows the sensor device and/or passive protection device to be repositioned.

The joint arrangement can have motors which change the position of the sensor device and/or passive protection device by adapting, for example, an adjustment angle and/or extended position of each joint. The motors make it possible to move the joint arrangement into the desired first arrangement or second arrangement of the sensor device and/or passive protection device.

The motors can be designed, for example, as direct current or alternating current motors, as well as three-phase motors, for example also as servomotors and/or stepper motors. Hydraulic and/or mechanical transmission elements and/or branching elements could be connected between the motors and the joint arrangement.

The autonomous vehicle can have an evaluation apparatus which is designed to evaluate signals from the sensor device, in such a way that an intrusion of an obstacle into the detection region surrounding the autonomous vehicle and received transport frame and/or an object to be transported is recognized during a journey of the autonomous vehicle. Intrusion of an obstacle into the detection region surrounding the autonomous vehicle and the received transport frame is understood in particular to mean that an obstacle comes so close to the autonomous vehicle together with the received transport frame that the sensor device collides with the obstacle, or the obstacle comes at least into the detection region of the sensor device. In particular, it is possible that the obstacle moves towards the autonomous vehicle and/or moves into the lane of the autonomous vehicle, and/or the autonomous vehicle moves towards the obstacle. The obstacle can also be one or more persons.

The sensor device can be designed to generate signals which indicate contact with an obstacle of the sensor device or an intrusion of the obstacle into the detection region of the sensor device. The signals can in particular show the change in a traction force on a traction means, the change in the extended length of a traction means, the change in a compressive force on the outer surfaces of contact bodies of the sensor device, the change in the total capacitance of a capacitive sensor, the transit time measurement of an ultrasonic signal or light signal, the change in light intensity, the change in pressure in a closed volume of air, the change in a projected pattern of light, the change in image data, the evaluation of a radar unit, the change in traction on parts of the joint arrangement, a change in position of the joint arrangement or an interruption of a light beam, for example a light barrier of the sensor device. In the case of passive protection apparatuses, a change in the motor current on the drive could indicate a collision. An electrical signal can be generated in particular by actuating, for example, a micro switch that is actuated by the traction means or the contact body, or by interrupting a light beam by the obstacle.

The autonomous vehicle can have an evaluation apparatus which evaluates the signals from the sensor device. The evaluation apparatus can convert the signals into electrical signals. The conversion allows the signals to be passed on, for example, to a control unit of the autonomous vehicle.

The sensor unit can accordingly have an electrical or electronic connection, selectively a wired or a wireless connection to the evaluation apparatus, which transmits the signals from the sensor unit to the evaluation apparatus and/or the control unit.

The sensor device can be designed and the evaluation apparatus can be configured to monitor a peripheral boundary line spanned by the sensor device running around the autonomous vehicle and the received transport frame and/or a surrounding peripheral field region for the intrusion of an obstacle.

The autonomous vehicle can have a control unit which is configured to control the at least one driven wheel based on the intrusion of an obstacle into the detection region of the sensor device.

The control unit of the autonomous vehicle either plans the route of the autonomous vehicle and travels it independently, i.e. without a driver, or travels a pre-planned route independently, i.e. without a driver. The control unit can, for example, access data and/or signals from the evaluation apparatus, which data and/or signals characterize the intrusion of an obstacle and are detected by means of the sensor device. The control unit of the autonomous vehicle can then adjust the route accordingly, for example initiate an evasive maneuver or stop the autonomous vehicle. The control unit can have a connection interface to an external computer system. The connection interface can be used to transmit pre-planned routes and can be used to plan the transport of objects by means of the transport frame. The control unit can in particular be designed as a microcontroller.

In a first general embodiment variant, the sensor device can be designed as at least one contact sensor running circumferentially about the autonomous vehicle and/or the received transport frame.

A contact sensor is generally understood to mean any sensor that can determine, i.e. detect, a feared, imminent, and/or occurred contact of the autonomous vehicle, in particular the sensor device thereof, with an object in the surroundings, which can also be referred to as a collision object. The contact sensor can work in this respect in a contactless or contacting manner. In the simplest case, the contact sensor is a mechanical contact sensor that has a switching strip that switches when the switching strip is touched and/or moved by the collision object. The switching strip can in this respect have a mechanical contact body and an electrical switch mechanically coupled thereto, which switches when the contact body is moved by the collision object. The movements of the switching strips can be detected, for example, by traction sensors in the holder or in suspensions or rails of the sensor device. Changes in the position of the holder or the suspensions or the rails can be detected electromechanically, for example by means of a potentiometer.

Instead of a switching strip, the contact sensor can also have a tactile skin that reacts to contact. The contact sensor can in this respect have at least one capacitive sensor which generates a switching signal when it is touched. However, the tactile skin can also comprise an air cushion to which a pressure sensor is coupled. When the air cushion is touched, the pressure inside the lift cushion rises, and the pressure sensor can detect a corresponding rise or fall in pressure.

In the embodiment as a contactless contact sensor, this can have one or more ultrasonic sensors which can detect their surroundings by emitted ultrasonic waves and received reflections of these ultrasonic waves from approaching objects. Instead of ultrasonic sensors, radar sensors can also be used, which in this respect work in a different frequency range.

In the embodiment as a contactless contact sensor, this can also have optical detection means, such as cameras for snapshots or video recordings.

The contactless contact sensor can also comprise at least one laser sensor or laser scanner.

The contact sensor can be designed to detect obstacles in the immediate surroundings of the autonomous vehicle and/or the received transport frame by means of mechanical, in particular electromechanical, means. An approach of the autonomous vehicle to an obstacle can, for example, trigger an electrical contact to be actuated mechanically in such a way that an electrical signal is generated and the evaluation apparatus is designed to receive and evaluate the electrical signal.

The sensor device can have at least one rigid contact body which comprises an outer surface which is designed for the touching detection of obstacles in the route of the autonomous vehicle. The joint arrangement can be designed to move at least one rigid contact body from the first arrangement into the second arrangement, in that the joint arrangement outwardly moves the at least one rigid contact body between two adjacent legs of the transport frame received by the autonomous vehicle.

In the second arrangement of the rigid contact bodies, these can be arranged on an end joint or overlapping one another, so that a closed contour is created. For this purpose, edges of the rigid contact bodies can be provided with further sensors which are designed to be able to detect an end joint or an overlapping arrangement of second adjacent contact bodies. In this respect, the further sensors form an end position recognition for the rigid contact bodies in the second arrangement. The further sensors can have one or more of the sensor types as described for the contact sensors. In this respect, the further sensors can also selectively work either in a contacting or contactless manner.

In addition, the first arrangement and/or the second arrangement of the rigid contact bodies can be detected or determined by separate electromechanical switches, mutual electrical contacting of adjacent contact bodies, and/or by optical sensors. The joint position of the joint arrangement can also be detected by means of joint sensors, such as rotary encoders, rotational position sensors, and/or linear position sensors.

Each joint arrangement can be moved by means of a lever, by means of a Bowden cable, hydraulically, pneumatically, and/or by means of an electric motor. The joint arrangement can act linearly adjusting, work moving on a circular path, or be designed to adjust any other path.

The rigid contact body can be designed to actuate a switch that generates an electrical signal when it comes into contact with an obstacle. A plurality of rigid contact bodies can be provided, in particular partially overlapping, running completely around the autonomous vehicle or running completely around the total peripheral contour. The plurality of rigid contact bodies can be arranged so as to overlap, for example, in such a way that a juxtaposed connection of the overlapping outer surfaces of the plurality of rigid contact bodies is generated when repositioning the rigid contact body by means of the joint arrangement. The overlapping juxtaposition makes it possible, in particular, to enlarge the protection region of the sensor device within the framework of the maximum overlap overhang, in order to encompass not only the autonomous vehicle over the circumference in the second arrangement, but also the transport frame received.

In each case at least one rigid contact body can each be arranged on a second link of the joint arrangement and each second link can be mounted by means of joints and first links of the joint arrangement so as to be repositioned from the first arrangement into the second arrangement, and each rigid contact body can be assigned a movement sensor, such as a micro switch, designed to detect a movement of each contact body when an obstacle abuts against each outer surface of the rigid contact body.

As an alternative to rigid contact bodies, the sensor device can have a traction means which is mounted so as to run around the autonomous vehicle and/or the received transport frame by means of deflection apparatuses, the traction means forming the peripheral boundary line of the detection region of the sensor device, and the deflection apparatuses are mounted by means of the joint arrangement so as to be repositioned from the first arrangement into the second arrangement. In such a case, the joint arrangement can be designed, for example, to move the traction means from the first arrangement into the second arrangement in that the joint arrangement outwardly moves the traction means, for example, under the legs of the transport frame received by the autonomous vehicle, which legs are lifted from the ground.

The traction means has the advantage that a very flat sensor device can be created therewith. The traction means can be guided using a few simple rails and/or rollers.

The traction means can have a connection to the evaluation apparatus in such a way that the traction means is guided around the basic contour and/or the total contour of the vehicle body by means of the deflection apparatuses, which can be mounted on the joint arrangement, in particular on at least one second link of the joint arrangement. At least one end portion of the traction means can be connected to a detector which is designed to detect a traction force or a traction movement of the traction mechanism and to generate a signal characterizing the traction force or traction movement based on the traction force or traction movement detected.

Additionally or alternatively, the traction means can be held firmly in position, so that contact therewith would result in a change in position and/or a change in traction in the joint arrangement.

The traction means can for example be designed as a cord or wire. The traction means can be designed to cause a change in length, change in position, or change in deflection of the traction means in the event of lateral contact between an obstacle and the traction means, which causes the traction force or traction movement and which is then evaluated. Furthermore, the traction means can be designed to trigger a change in position and/or change in load in the joint arrangement in the event of contact, which in turn is evaluated there via suitable position sensors and/or traction sensors.

Each triggering physical effect can be a change in the traction of the traction mechanism, a change in the length of the cord, or a change in the traction means holder. A change in the traction means holder can take place, for example, by a switch that detects an end position of a lever or slide connected to the traction mechanism. In this respect, the slide can allow linear detection. A change in the traction means holder can also be detected by a change in traction on the traction means holder.

In each case, a single deflection device can be each arranged on a second link of the joint arrangement and each second link can be mounted by means of joints and first links of the joint arrangement so as to be repositioned from the first arrangement into the second arrangement, whereby the traction means is guided around the basic peripheral contour and/or the total peripheral contour of the vehicle body, it being possible for the traction means, in particular an end portion of the traction means, to be connected to a detector which is designed to detect a movement of the traction means and to generate a signal characterizing the movement based on the detected movement.

The deflection apparatus can have rollers which are rotatably mounted on the joint arrangement.

The deflection apparatus is generally designed to guide the traction means around the basic contour and/or the total contour of the vehicle. For this purpose, the deflection apparatus can have a plurality, for example four, rotatably mounted rollers each on a joint arm or joint part of the joint arrangement, which guide the traction means and steer it around the autonomous vehicle. Instead of rotatably mounted rollers, rigid, fixed guide troughs can optionally also be provided, in which the traction means is guided laterally and secured against jumping out and over which the traction means can glide within the guide troughs.

In a second general embodiment variant, the sensor device can be designed as at least one contactless sensor.

The contactless sensor can be designed to detect obstacles in the immediate surroundings of the autonomous vehicle in that a monitored light beam from the sensor device is interrupted by the obstacle.

The sensor device can accordingly comprise a light barrier, comprising at least one light transmitter designed to emit a light beam, at least one light receiver designed to receive the light beam, and at least one deflecting mirror and/or deflecting prism designed to guide the light beam emitted by the light transmitter around the basic peripheral contour and/or the total peripheral contour of the vehicle body to the light receiver.

The light barrier has, for example, a light transmitter which generates a light beam which, using at least one or more deflecting mirrors and/or deflecting prism, in particular three deflecting mirrors, guides the light beam to a light receiver, which is designed to detect the light beam.

The triggering effect cannot only be the interruption of the light beam, but also an adjustment of the deflecting mirror and/or the deflecting prism.

The deflecting mirror is designed to redirect a light beam. For this purpose, the deflecting mirror has a surface that reflects the light beam, the position and orientation of which can be changed by virtue of the joint arrangement.

The deflecting prism is designed to redirect a light beam. For this purpose, the deflecting prism has a surface that refracts the light beam, the position and orientation of which surface can be changed by virtue of the joint arrangement.

The light transmitter is designed to generate a light beam. The light transmitter can be a laser diode, for example.

The light receiver is designed to detect the light beam in such a way that the light receiver can generate at least two signals, on the one hand, for detecting the reception of a light beam and, on the other hand, for detecting the absence of a light beam.

BRIEF DESCRIPTION OF THE DRAWINGS

The accompanying drawings, which are incorporated in and constitute a part of this specification, illustrate exemplary embodiments of the invention and, together with a general description of the invention given above, and the detailed description given below, serve to explain the principles of the invention.

DETAILED DESCRIPTION

Figure 1:
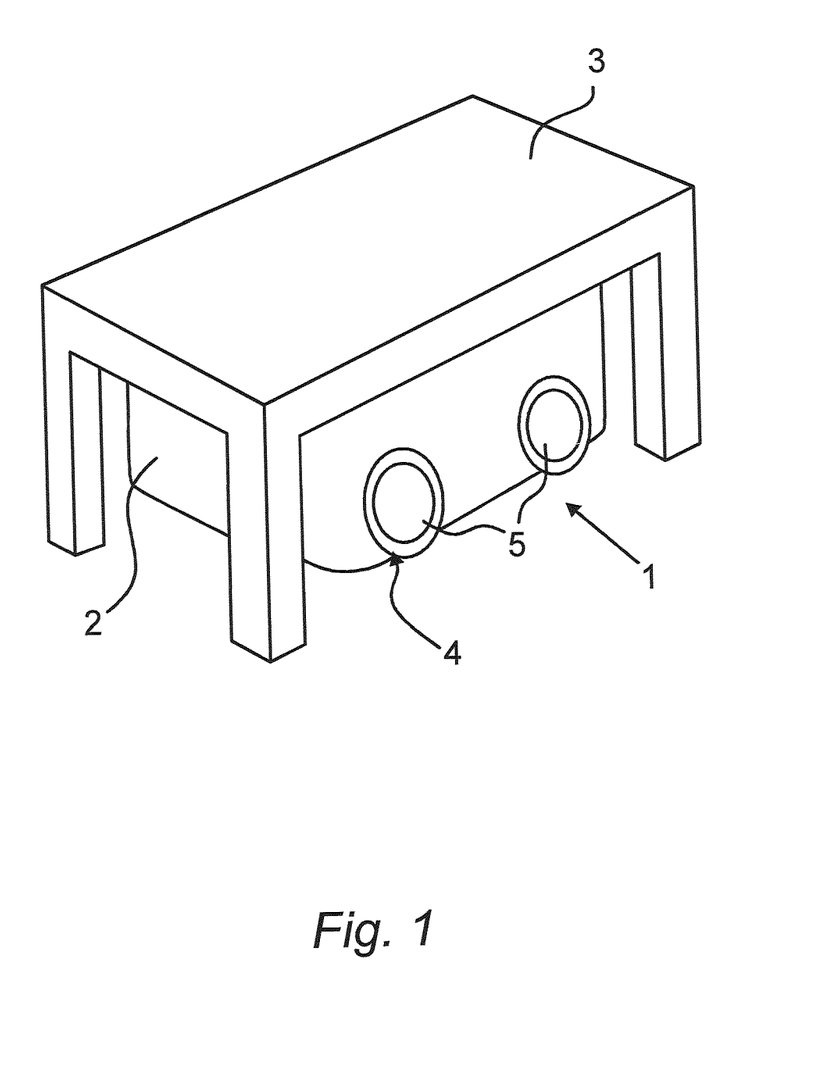
FIG. 1 is a perspective view of an autonomous vehicle having a received transport frame.

FIG. 1 shows a schematically illustrated autonomous vehicle 1, comprising a vehicle body 2 which is designed to receive a transport frame 3. The vehicle body 2 has a chassis 4 having wheels 5. The wheels 5 can be omnidirectional wheels, in particular Mecanum wheels.

Figure 2:
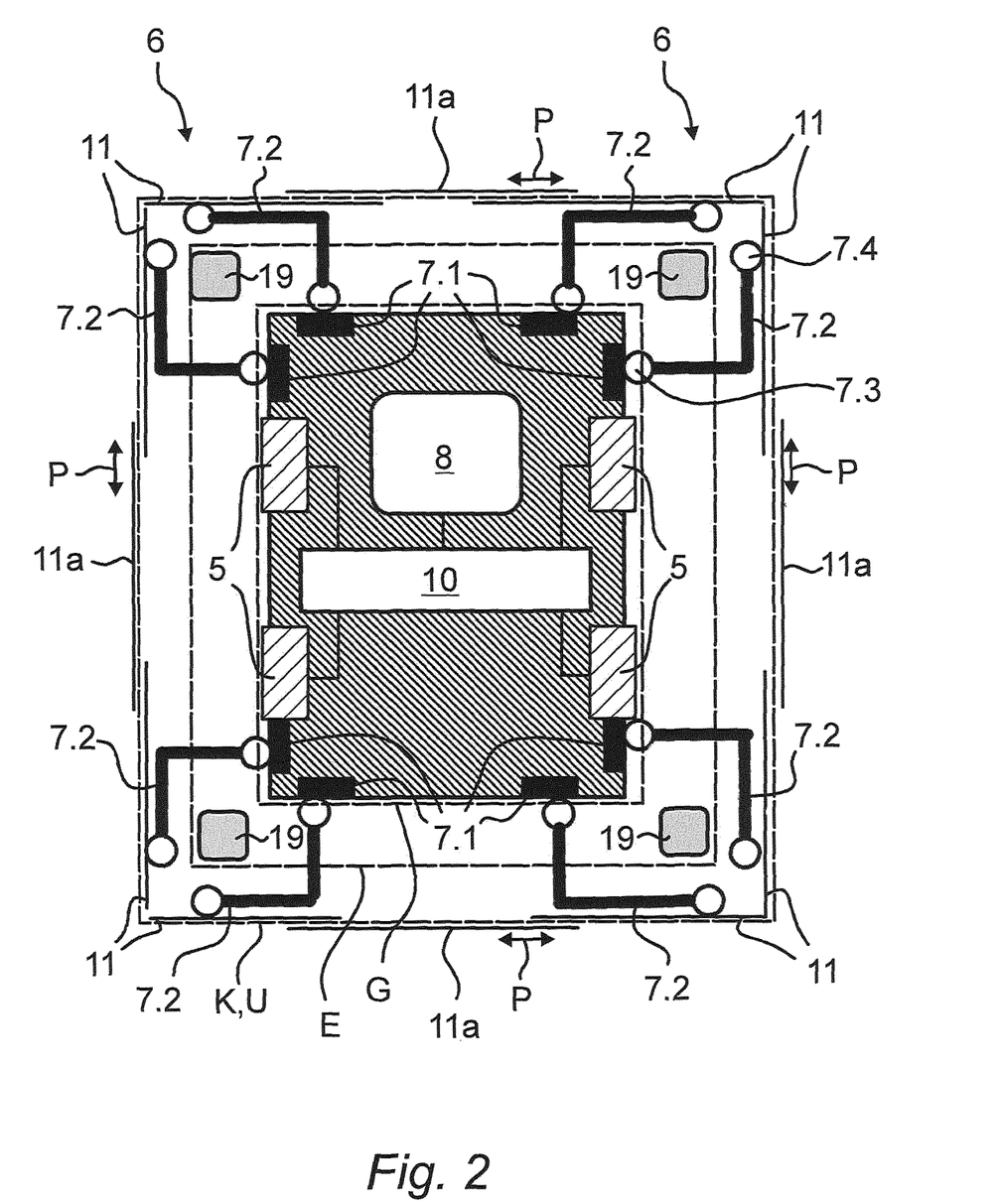
FIG. 2 is a schematic view of the autonomous vehicle having a joint arrangement and a first embodiment of a sensor device having rigid contact bodies.
Figure 3:
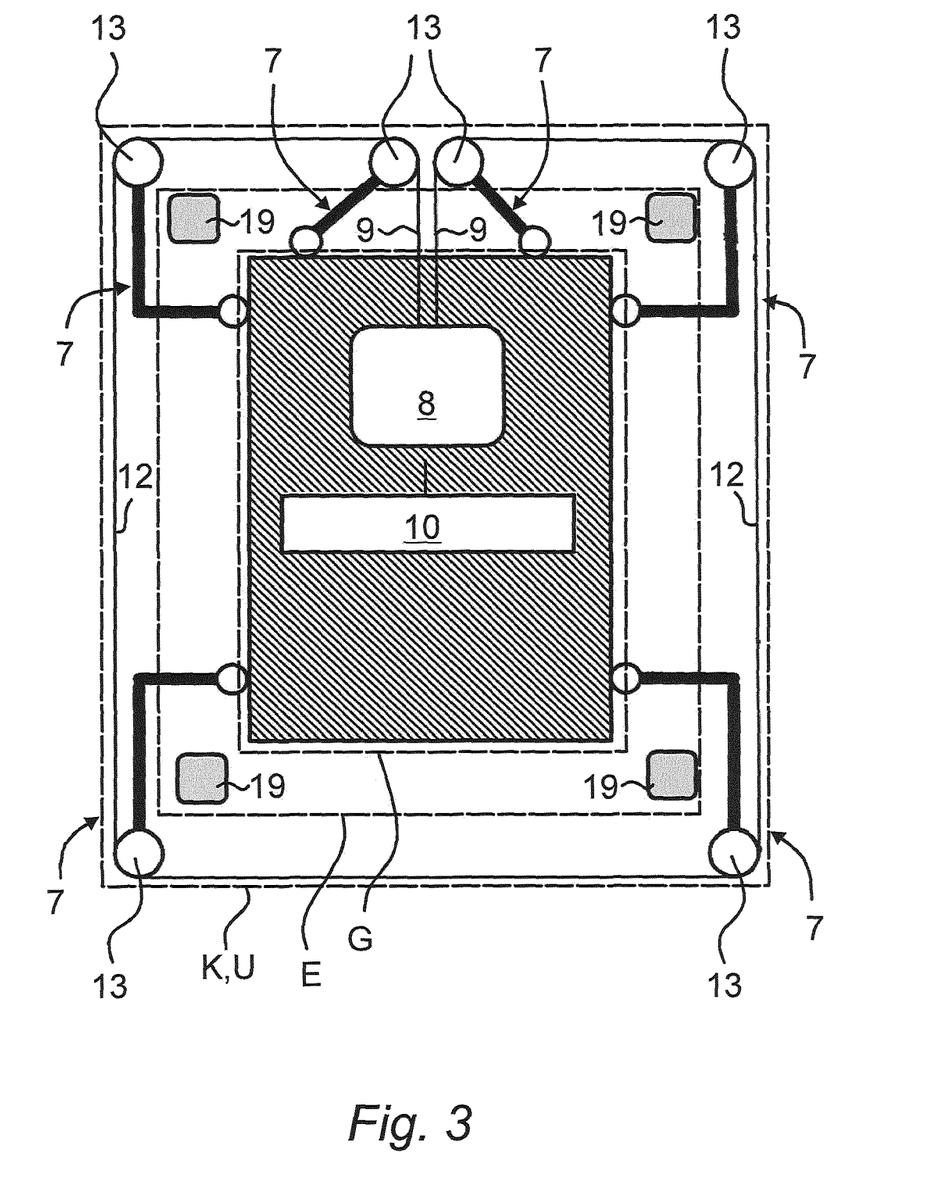
FIG. 3 is a schematic view of the autonomous vehicle having a joint arrangement and a second embodiment of a sensor device having a traction means.
Figure 4:
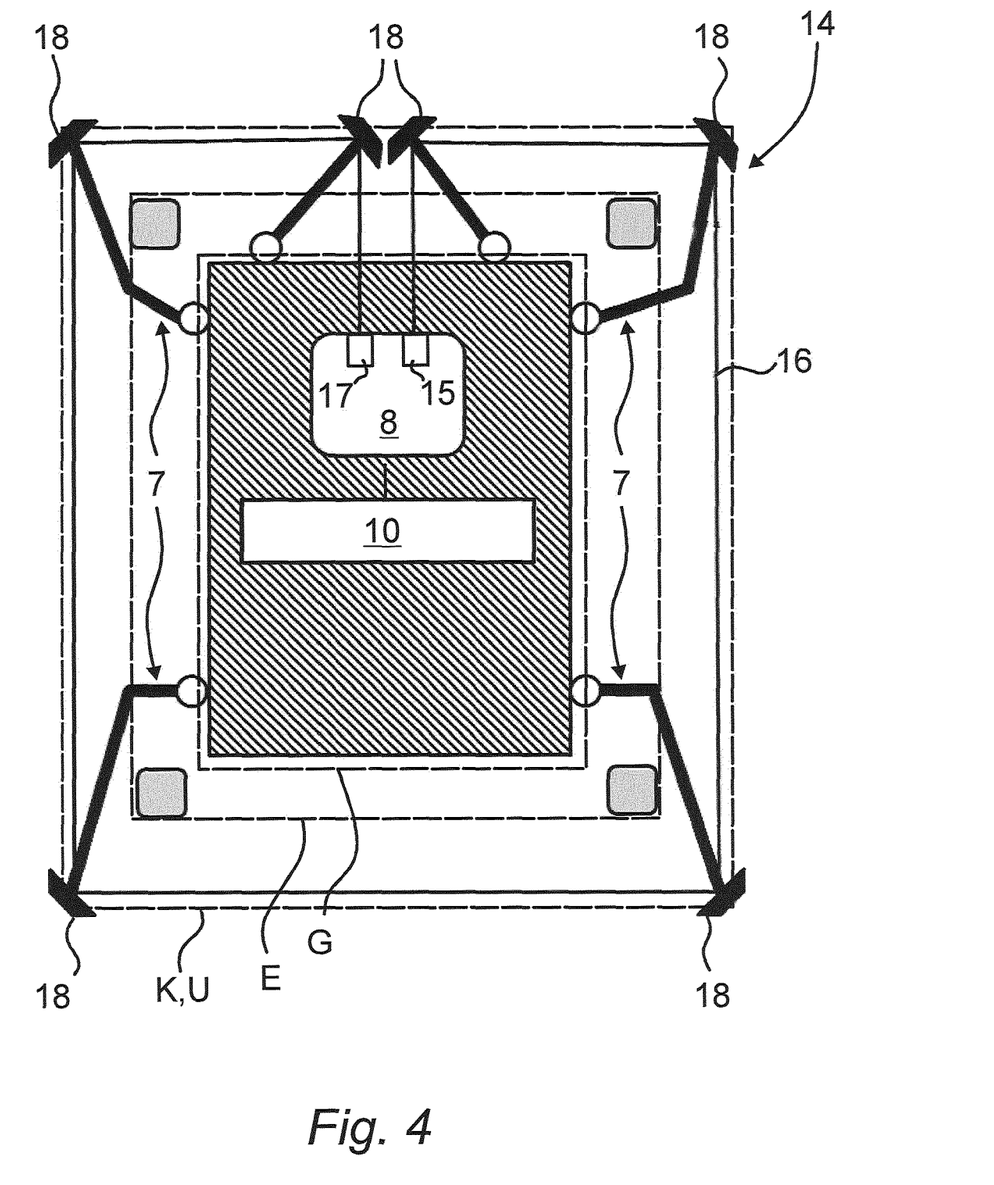
FIG. 4 is a schematic view of the autonomous vehicle having a joint arrangement and a third embodiment of a sensor device having a light barrier.

FIGS. 2, 3, and 4 each show a structure of an autonomous vehicle 1 in a horizontal cross section each with a sensor device 6, which is shown in the respective figures in different embodiments. The sensor device 6 generally has a detection region for recognizing obstacles in the immediate surroundings of the autonomous vehicle 1. The autonomous vehicle 1 also generally has a corresponding joint arrangement 7 in each case which is designed to adjust the sensor device 6 in relation to the vehicle body 2 in such a way that the sensor device 6 can selectively be operated in a first arrangement which monitors the basic contour G of the vehicle body 2, or be operated in at least one second arrangement which monitors a total contour K consisting of the basic contour G and an expansion contour E of the autonomous vehicle 1 that is formed when a transport frame 3 is received, in which second arrangement the sensor device 6 is repositioned in relation to the first arrangement in such a way that a transport frame 3 received by the autonomous vehicle 1 is encompassed by an outwardly detecting detection region B of the sensor device 6 surrounding the total peripheral contour completely in the second arrangement.

The joint arrangement 7 can be present multiple times. In the case of the embodiments shown, the joint arrangement 7 can in particular be present in four ways, in particular in such a way that a single joint arrangement 7 is arranged in each corner region of the autonomous vehicle 1. Each individual joint arrangement 7 has at least two links 7.1 and 7.2 and at least one joint 7.3, in particular also two joints 7.3, 7.4. In the case of the present embodiment, a first link 7.1 is connected to the autonomous vehicle 1, in particular designed thereon, and a sensor device 6 is attached to the second link 7.2. The joint 7.3 and/or the joint 7.4 connects the first link 7.1 to the second link 7.2 or to the sensor device 6 and thereby allows the adjustability of the sensor devices 6.

The position for the second arrangement can be assumed by adjusting the joint arrangements 7. In the second arrangement, the sensor units 6 are adjusted in such a way that a transport frame 3, which is larger than the basic contour G of the vehicle body 2, is located within the protection region of the sensor units 6. For this purpose, the sensor units 6 are repositioned in such a way that, for example, the legs 19 of the transport frame 3 lie inside the region monitored by the sensor devices 6, i.e. the detection region B of the sensor devices 6 is directed outwards and the transport frame 3, for example also the legs 19 thereof, is in an inner, non-monitored region when the sensor units 6 are in the second arrangement.

In the case of the present embodiment, the autonomous vehicle 1 has an evaluation apparatus 8 which is located on the vehicle. The sensor device 6 or the plurality of sensor devices 6 are connected to the evaluation apparatus 8 in such a way that sensor signals from the sensor devices 6 can be passed to the evaluation apparatus 8 for their evaluation.

In all embodiments, the autonomous vehicle 1 also has a control unit 10 which is designed to control the wheels 5 of the autonomous vehicle 1 in order to be able to automatically drive and/or automatically navigate the autonomous vehicle 1 in the surroundings.

The control unit 10 is also designed to process signals from the evaluation apparatus 8. Based on the states of the sensor devices 6 and/or the joint arrangements 7, the evaluation apparatus 8 can determine at which point or points a collision occurs. Based on the presence or absence of a collision and the local positions of the detected collision objects, the control unit 10 can then control the wheels 5 accordingly in order to stop the autonomous vehicle 1, for example, at the obstacle, to evade the obstacle, and/or to drive around the obstacle.

FIGS. 2 and 3 each show an autonomous vehicle 1 which has differently designed sensor devices 6, which, however, are both designed as a mechanical contact sensor. In contrast, FIG. 4 shows an embodiment which is designed with an optical sensor.

FIG. 2 shows the autonomous vehicle 1 having a sensor device 6 which has contact bodies 11 mounted on the respective joint arrangements 7. Each contact body 11 has an outer surface which detects the approach or contact with obstacles, a corresponding signal being generated when the contact body 11 comes into contact with an obstacle, which is then evaluated by the evaluation apparatus 8, and, subsequently, the control unit 10 controlling the wheels based on the evaluation.

In the second arrangement, the contact bodies 11 are adjusted accordingly in such a way that a transport frame 3, which is larger than the basic contour G of the vehicle body 2, is located within the protection region of the contact bodies 11. For this purpose, the contact bodies 11 are repositioned in such a way that, for example, the legs 19 of the transport frame 3 lie inside the region monitored by the contact bodies 11, i.e. the detection region B of the contact bodies 11 is directed outwards and the transport frame 3, for example also the legs 19 thereof, is in one inner, non-monitored region when the contact bodies 11 are in the second arrangement. The contact bodies 11 can interact in such a way that they form a barrier running around the entire autonomous vehicle 1. Two adjacent contact bodies 11 can at least partially overlap. On one or more contact bodies 11, further auxiliary contact bodies 11a can be mounted so as to be adjustable in the direction of arrow P, for example.

FIG. 3 shows the autonomous vehicle 1 which has a sensor device 6 which comprises a traction means 12, the end portions 9 of the traction means 12 being connected to the evaluation apparatus 8 in such a way that the traction means 12 is initially positioned so as to run around the autonomous vehicle 1 and the received transport frame 3 or the legs 19 thereof by means of deflection apparatuses 13, the traction means 12 forming the peripheral boundary line U of the detection region B of the sensor device 6, and the deflection apparatuses 13 being able to be repositioned by means of the joint arrangements 7 so as to be repositioned from the first arrangement into the second arrangement, to mount the traction means 12 in the first arrangement on a smaller circumference around the autonomous vehicle 1 and to mount the traction means 12 in the second arrangement on a larger circumference around the autonomous vehicle 1

The deflection apparatus 13 can for example be designed with rollers which are mounted on the joint arrangement 7, in particular on the second link 7.2 of the joint arrangement 7.

FIG. 4 shows a further embodiment of the autonomous vehicle 1, which has a sensor device 6 which is designed as at least one contactless sensor.

The contactless sensor device 6 according to FIG. 4 comprises a light barrier 14, comprising at least one light transmitter 15 designed to emit a light beam 16, at least one light receiver 17 designed to receive the light beam 16, and, in the case of the present embodiment, a total of six deflecting mirrors 18 designed to guide the light beam 16 emitted by the light transmitter 15 around the basic peripheral contour G and/or the total peripheral contour K of the vehicle body 2 to the light receiver 17.

In the second arrangement, the deflecting mirrors 18 are adjusted accordingly in such a way that a transport frame 3, which is larger than the basic contour G of the vehicle body 2, is located within the protection region of the light beam 16. For this purpose, the deflecting mirrors 18 are repositioned in such a way that, for example, legs 19 of the transport frame 3 lie inside the region monitored by the light beam 16, i.e. the detection region B of the light beam 16 runs around the transport frame 3 and thus also surrounds the legs 19 thereof when the deflecting mirrors 18 are in the second arrangement.

While the present invention has been illustrated by a description of various embodiments, and while these embodiments have been described in considerable detail, it is not intended to restrict or in any way limit the scope of the appended claims to such de-tail. The various features shown and described herein may be used alone or in any combination. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit and scope of the general inventive concept.

What is claimed is:

1. An autonomous vehicle, comprising:
   a vehicle body having a receiving device designed to receive, on the vehicle body, an object to be transported;
   a chassis supporting the vehicle body and having at least one driven wheel;
   at least one sensor device, the sensor device having a detection region surrounding the autonomous vehicle for detecting obstacles that enter the detection region of the sensor device in the immediate surroundings of the autonomous vehicle; and
   a joint arrangement designed to adjust the sensor device in relation to the vehicle body in such a way that the sensor device is selectively operable in:
   a first arrangement which monitors the basic peripheral contour of the vehicle body, and
   at least one second arrangement which monitors a total peripheral contour comprising the basic peripheral contour and an expansion contour of the autonomous vehicle that is formed when the object to be transported is received on the autonomous vehicle;
   wherein, in the second arrangement, the sensor device is repositioned relative to the first arrangement in such a way that the object received on the autonomous vehicle is encompassed by an outwardly detecting detection region of the sensor device surrounding the total peripheral contour completely.

2. The autonomous vehicle of claim 1, wherein:
   the joint arrangement comprises at least two links and at least one joint;
   a first link of the at least two links is connected to the vehicle;
   a second link of the at least two links has the sensor device; and
   the joint adjustably connects the first link to the second link.

3. The autonomous vehicle of claim 1, further comprising an evaluation apparatus designed to evaluate signals from the sensor device such that an intrusion of an obstacle into the detection region surrounding the autonomous vehicle and the received object is detected during a journey of the autonomous vehicle.

4. The autonomous vehicle of claim 3, wherein the sensor device is designed and the evaluation apparatus is configured to monitor, for the intrusion of an obstacle, at least one of:
   a peripheral boundary line spanned by the sensor device and surrounding the autonomous vehicle and the received object to be transported; or
   a surrounding peripheral field region surrounding the autonomous vehicle.

5. The autonomous vehicle of claim 1, further comprising a control unit configured to control the at least one driven wheel based on a detected intrusion of an obstacle into the detection region of the sensor device.

6. The autonomous vehicle of claim 1, wherein the sensor device is designed as at least one contact sensor extending around at least one of the autonomous vehicle or the received object to be transported.

7. The autonomous vehicle of claim 6, wherein the sensor device comprises at least one rigid contact body that includes an outer surface designed for contact detection of obstacles in a route of the autonomous vehicle.

8. The autonomous vehicle of claim 7, wherein:
   the at least one rigid contact body is arranged on a second link of the joint arrangement, and each second link is mounted to the vehicle by joints and first links of the joint arrangement so as to be repositionable to and between the first arrangement and the second arrangement; and
   each rigid contact body is assigned a movement sensor designed to detect a movement of the respective contact body when an obstacle abuts against the outer surface of the rigid contact body.

9. The autonomous vehicle of claim 6, wherein:
   the sensor device comprises a traction means mounted by deflection devices so as to extend around at least one of the autonomous vehicle or the received object;
   the traction means forms a peripheral boundary line of the detection region of the sensor device; and
   the deflection devices are mounted by the joint arrangement so as to be repositionable to and between the first arrangement and the second arrangement of the sensor device.

10. The autonomous vehicle of claim 9, wherein:
a single deflection apparatus is arranged on a second link of the joint arrangement. and each second link is mounted by joints and first links of the joint arrangement so as to be repositionable to and between the first arrangement and the second arrangement, whereby the traction means is guided around at least one of the basic peripheral contour or the total peripheral contour of the vehicle body;

the traction means being connected to a detector that is designed to detect a movement of the traction means and to generate a signal characterizing the movement based on the detected movement.

11. The autonomous vehicle of claim 10, wherein an end portion of the traction means is connected to a detector designed to detect a movement of the traction means and generate a signal.

12. The autonomous vehicle of claim 9, wherein the deflection devices comprise rollers that are rotatably mounted on the joint arrangement.

13. The autonomous vehicle of claim 1, wherein the sensor device is designed as at least one contactless sensor.

14. The autonomous vehicle of claim 13, wherein:
the sensor device comprises a light barrier;
the light barrier comprising:
- at least one light transmitter designed to emit a light beam,
- at least one light receiver designed to receive the light beam, and
- at least one deflecting mirror or a deflecting prism designed to guide the light beam emitted by the light transmitter around at least one of the basic peripheral contour or the total peripheral contour of the vehicle body to the light receiver.

* * * * *